(12) United States Patent
Cho et al.

(10) Patent No.: US 9,141,579 B2
(45) Date of Patent: Sep. 22, 2015

(54) APPARATUS AND METHOD FOR ROUTING DATA AMONG MULTIPLE CORES

(75) Inventors: Yeon-Gon Cho, Hwaseong-si (KR);
Yen-Jo Han, Seongnam-si (KR);
Soo-Jung Ryu, Hwaseong-si (KR);
Jae-Young Kim, Namyangju-si (KR);
Woong Seo, Hwaseong-si (KR);
Hee-Jun Shim, Seoul (KR); Jin-Seok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 838 days.

(21) Appl. No.: 13/033,728

(22) Filed: Feb. 24, 2011

(65) Prior Publication Data
US 2011/0252179 A1 Oct. 13, 2011

(30) Foreign Application Priority Data

Apr. 13, 2010 (KR) ........................ 10-2010-0033774

(51) Int. Cl.
*G06F 15/173* (2006.01)
*G06F 12/08* (2006.01)
(52) U.S. Cl.
CPC ...... *G06F 15/17343* (2013.01); *G06F 12/0806* (2013.01)
(58) Field of Classification Search
CPC . G06F 8/445; G06F 12/0806; G06F 12/0842; G06F 15/17343
See application file for complete search history.

(56) References Cited

U.S. PATENT DOCUMENTS

| 7,808,950 | B2 * | 10/2010 | Kizu et al. | 370/331 |
|---|---|---|---|---|
| 8,291,400 | B1 * | 10/2012 | Lee et al. | 717/161 |
| 2003/0126358 | A1 * | 7/2003 | Litt et al. | 711/108 |
| 2005/0204101 | A1 | 9/2005 | Fukuzo | |
| 2006/0236041 | A1 | 10/2006 | Sohn et al. | |
| 2008/0288965 | A1 * | 11/2008 | Grechanik et al. | 719/328 |
| 2009/0077361 | A1 * | 3/2009 | Neiger et al. | 712/241 |
| 2010/0185835 | A1 * | 7/2010 | Leijten et al. | 712/208 |

FOREIGN PATENT DOCUMENTS

| KR | 10-2006-0100143 | 9/2006 |
|---|---|---|
| KR | 10-2008-0034313 | 4/2008 |
| KR | 10-2008-0046065 | 5/2008 |
| KR | 10-2008-0046067 | 5/2008 |
| KR | 10-2008-0096168 | 10/2008 |

* cited by examiner

*Primary Examiner* — Ajay Catttungal
(74) *Attorney, Agent, or Firm* — NSIP Law

(57) ABSTRACT

An apparatus and method for routing data among multicores that is capable of reconfiguring the connection among the multicores are provided. The apparatus includes a configuration information generating unit and at least one switching unit. The configuration information generating unit is configured to generate configuration information that indicates a local network connection among the multicores based on a program counter received from each of the multicores. The at least one switching unit is configured to change a data transfer path among the multicores based on the configuration information.

17 Claims, 8 Drawing Sheets

APPARATUS AND METHOD FOR ROUTING DATA AMONG MULTIPLE CORES

CROSS-REFERENCE TO RELATED APPLICATION(S)

This application claims the benefit under 35 U.S.C. §119(a) of Korean Patent Application No. 10-2010-0033774, filed on Apr. 13, 2010, in the Korean Intellectual Property Office, the entire disclosure of which is incorporated herein by reference for all purposes.

BACKGROUND

1. Field

The following description relates to a multi-core system, and more particularly, to an apparatus for effectively routing data among multiple cores included in the multi-core system.

2. Description of the Related Art

A direct memory access (hereinafter, referred to as DMA) controller may be used to perform data transfer from a memory to a peripheral device or from a peripheral device to a memory, independent of the central processing unit (CPU) of a computer system. In general, according to the DMA controller, predetermined data may be directed to be transferred from a source location to a destination location. However, when the DMA controller is used in a multi-core environment to transfer data between the cores, the DMA controller needs to be provided in plural. This plurality may complicate the bus system architecture between the cores. In addition, in order to change a data transfer path in a bus system between the cores, an additional operating system is needed.

SUMMARY

In one general aspect, there is provided an apparatus for routing data among multicores, the apparatus comprising a configuration information generating unit configured to generate configuration information indicating a local network connection among the multicores by use of a program counter received from each of the multicores, and at least one switching unit configured to change a data transfer path among the multicores according to the configuration information.

The configuration information generating unit may comprise a control register configured to store program counters for the respective multicores, the program counter for each multicore indicates an instruction which is to be executed when the data transfer path is changed, a condition checking unit configured to receive each respective program counter from the multicores and compare each received program counter with the stored program counter for that respective multicore, and a lookup table configured to output the configuration information to the switching unit, if the received program counter is the same as the stored program counter.

The lookup table may comprise an address output unit configured to output address information for the same program counter, and a configuration information output unit configured to output configuration information for the address information.

Operating system (OS) set configuration information may be set in the configuration information generating unit, and the OS set configuration information may be configured to change the data transfer path according to a real time request by an OS.

Manually set configuration information, which may be set by manual input, may be set in the configuration information generating unit.

The configuration information generating unit may select one of the configuration information generated by use of the program counter, the OS set configuration information, and the manually set configuration information, and transfers the selected configuration information to the switching unit.

The apparatus may further comprise a profiling unit configured to perform profiling on an application to be executed in the multicores and set program counters for the respective multicores in the control register, wherein the program counter for each multicore indicates an instruction which is to be executed when the data transfer path is changed.

In another aspect, there is provided a method of routing data among multicores, the method comprising generating configuration information indicating a local network connection among the multicores based on a program counter received from each of the multicores, and changing a data transfer path among the multicores based on the configuration information.

The generating of the configuration information may comprise receiving the respective program counters from the multicores, comparing a stored program counter for each multicore with the received program counter for each respective multicore, in which the stored program counter for each multicore indicates an instruction which is to be executed when the data transfer path is changed, and outputting configuration information for changing the data transfer, if the received program counter is the same as the stored program counter.

The outputting of the configuration information may comprise generating address information for the same program counter, and outputting configuration information for the is generated address information.

The generating of the configuration information may comprise selecting one of configuration information generated by use of the program counter, operating system set configuration information used to change the data transfer path upon a real time request by an operating system, and manually set configuration information set that is set manually, and transferring the selected configuration information.

The method may further comprise performing profiling on an application to be executed in the multicores, and setting the program counters for the respective multicores, the program counter for each of the multicores indicating an instruction which is to be executed when the data transfer path is changed.

In another aspect, there is provided a data routing apparatus, comprising a configuration information generating unit configured to receive a program counter from at least one core from among multiple cores, and to generate configuration information that indicates a local network connection among the multiple cores based on the received program counter, and a switching unit configured to change the data transfer path between the multiple cores to an optimal processing path based on the configuration information.

The switching unit may be a multiplexer.

The data routing apparatus may further comprise a profiling unit configured to measure the performance of each core of the multiple cores and to set a program counter for the at least one core based on an optimal processing performance of the multiple cores.

Other features and aspects will be apparent from the following detailed description, the drawings, and the claims.

Figure 1:
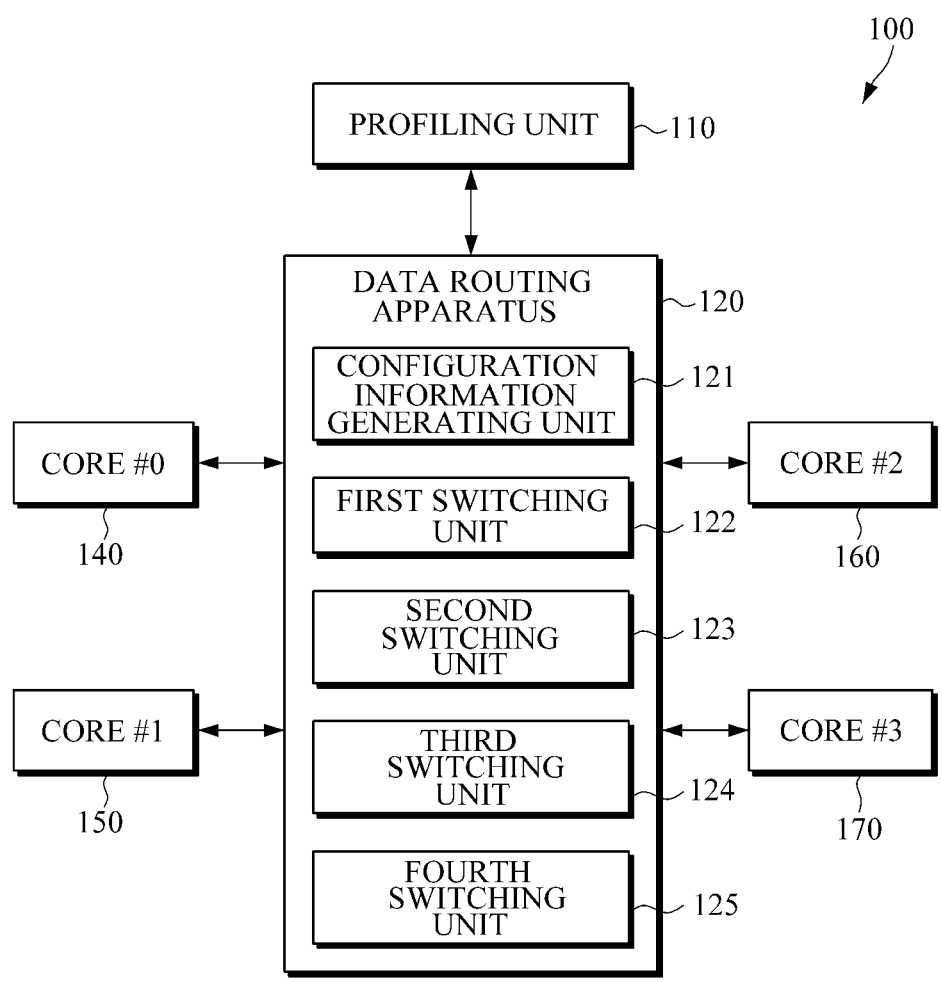
FIG. 1 is a diagram illustrating an example of a multi-core system including an apparatus for routing data among multicores.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a multi-core system including an apparatus for routing data among multicores.

Referring to FIG. 1, multicore system 100 includes a profiling unit 110 and a data routing apparatus 120 for routing data among multicores 140, 150, 160, and 170.

The profiling unit 110 may perform profiling for analyzing an operation of a program to be executed. For example, the profiling for an application may be achieved in various generally known schemes. In the example of FIG. 1, the profiling unit 110 is provided as an individual unit separated from the data routing apparatus 120 and the multicores 140, 150, 160, and 170. As another example, the profiling unit may be integrated into at least one of the data routing apparatus 120 and the multicores 140, 150, 160, and 170. In addition, the profiling unit 110 may perform profiling on the application to be executed and may set program counters for the respective multicores 140, 150, 160, and 170 in the data routing apparatus 120. The program counter for each of the multicores 140, 150, 160, and 170 may be used to indicate an instruction which is to be executed when the data transfer path is changed.

The data routing apparatus 120 may serve as a local network cell for providing data communication among the multicores 140, 150, 160, and 170. For example, the data routing apparatus 120 may be referred to as a local network router.

Referring to the example of FIG. 1, the data routing apparatus 120 includes a configuration information generating unit 121 and one or more switching units, for example, switching units 122, 123, 124, and 125.

The configuration information generating unit 121 may generate configuration information that indicates a local network connection among the multicores 140, 150, 160, and 170 based on the program counter received from each of the multicores 140, 150, 160, and 170. The configuration information may be used to determine connection among the multicores 140, 150, 160, and 170. Accordingly, the configuration information may determine an operation of the switching units 122, 123, 124, and 125.

As an example, operating system (OS) set configuration information, which is configured to change the data transfer path based on a real time request by an OS, may be set in the configuration information generating unit 121. As another example, manually set configuration information set by manual input may be set in the configuration information generating unit 121. The configuration information generating unit 121 may select one of configuration information generated by use of the program counter, the OS set configuration information, and the manually set configuration information, and may transfer the selected configuration information to the switching units 122, 123, 124, and 125.

The switching units 122, 123, 124, and 125 may change a data transfer path among the multicores 140, 150, 160, and 170 based on the configuration information. In this example, the switching units 122, 123, 124, and 125 include a first switching unit 122, a second switching unit 123, a third switching unit 124, and a fourth switching unit 125. Although four switching units 122, 123, 124, and 125 are shown in the example of FIG. 1, the number of switching units is not limited thereto.

The multicores 140, 150, 160, and 170 may be implemented by homogeneous cores. Alternatively, the multicores 140, 150, 160, and 170 may be implemented by heterogeneous cores that may include a central processing unit (CPU), a graphics processing unit (GPU), and a data signal processor (DSP). Although the number of the multicores shown in FIG. 1 is four, the number of multicores included in the multicore system 100 is not limited thereto.

The multicores 140, 150, 160, and 170 may perform data transmission/reception through is the switching units 122, 123, 124, and 125. For example, a core #0 140 is connectable to any one of the remaining multicores 150, 160, and 170. In this example, the connection of the core #0 140 is enabled and changed for the multicores 150, 160 and 170 by the switching unit 122. Accordingly, without having to use a direct memory access (DMA), the connection among cores in a multicore system is reconfigurable. In addition, the data routing apparatus 120 is configured in hardware, so high speed data transfer may be provided.

Figure 2:
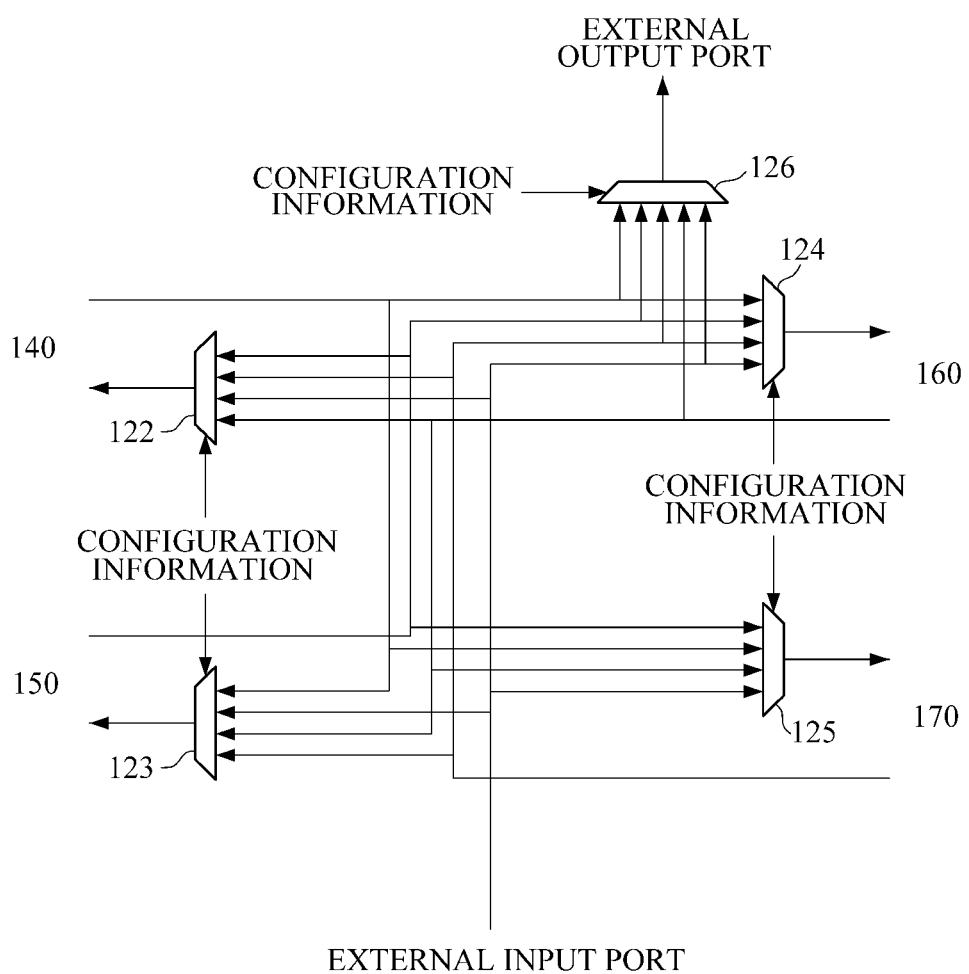
FIG. 2 is a diagram illustrating an example of switching units included in the apparatus for routing data among multicores shown in FIG. 1.

FIG. 2 illustrates an example of switching units included in the apparatus for routing data among multicores shown in FIG. 1.

Referring to FIG. 2, switching units 122, 123, 124, and 125 shown in FIG. 2 correspond to the first switching unit 122, the second switching unit 123, the third switching unit 124, and the fourth switching unit 125 shown in FIG. 1. The switching units 122, 123, 124, and 125 change a data connection path among the cores based on configuration information generated by the configuration information generating unit 121.

For example, the first switching unit 122 may perform data transfer between the core #0 140 and the cores 150, 160, and/or 170. The second switching unit 123 may perform data transfer between the core #1 150 and the cores 140, 160, and/or 170. The third switching unit 124 may perform data transfer between the core #2 160 and the cores 140, 150, and/or 170. The fourth switching unit 125 performs data transfer between the core #3 170 and the cores 140, 150, and/or 160. The fifth switching unit 126 may transfer configuration information to a device other than the multicores 140, 150, 160, and 170.

In an example in which the switching units 122, 123, 124, 125, and 126 are configured in the form of a multiplexer as shown in FIG. 2, the configuration information may be configuration bits or select bits used to select a data transfer path in the multiplexer. The multicore system 100 including the data routing apparatus 120 and the multicores 140, 150, 160, and 170 may be scalable for expansion through an external input port and an external output port.

Figure 3:
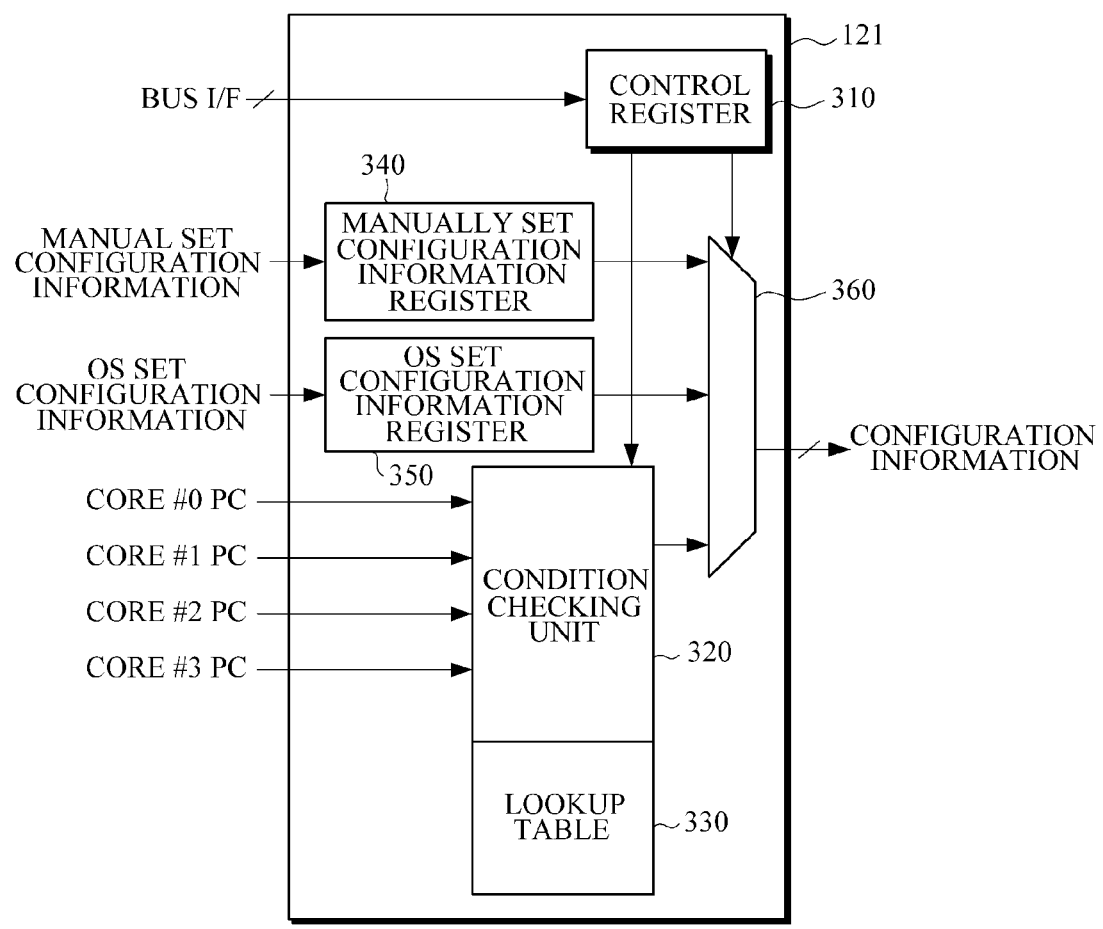
FIG. 3 is a diagram illustrating an example of a configuration information generating unit included in the apparatus for routing data among multicores shown in FIG. 1.

FIG. 3 illustrates an example of a configuration information generating unit included in the apparatus for routing data among multicores shown in FIG. 1.

Referring to FIG. 3, configuration information generating unit 121 includes a control register 310, a condition checking unit 320, a lookup table 330, a manually set configuration information register 340, an OS set configuration information register 350, and a configuration information select unit 360.

The control register 310 may store program counters for the respective multicores. For example, the program counter for each core may indicate an instruction which is to be executed when the data transfer path is changed.

The condition checking unit 320 receives the respective program counters from the multicores 140 and may compare the received program counter with the stored program counter. The program counter does not need to be received from each of the multicores 140, 150, 160, and 170 included in the multicore system 100. For example, the condition checking unit 320 may receive program counters from one or more of the multicores and may compare the received program counter with a pre-stored program counter for a corresponding multicore.

The lookup table 330 may output configuration information for changing the data transfer path to the switching units 122, 123, 124, 125, and 126, if the received program counter is the same as the stored program counter.

The manually set configuration information register 340 may store configuration information to be output to the switching units, for example, the switching units 122, 123, 124, 125, and 126 in FIG. 2. For example, if the connection among the multicores (140, 150, 160, and 170 in FIG. 1) does not need to be changed during the execution of an application, the configuration information which is set in the manually set configuration information register 340 may be transferred to the switching units 122, 123, 124, 125, and 126 such that the application is executed in a state where the connection among the multicores 140, 150, 160, and 170 is static. For example, the manually set configuration information may be input by a profiling unit 110 shown in FIG. 1, a core for executing the application, and/or by a user, and may be set in the manually set configuration information register 340.

For example, the profiling unit 110 may perform profiling by performing software unititioning for an application to be executed in the multicore system 100 and by generating a data flow graph and a control flow graph. For example, the profiling unit 110 may measure each performance of all configurations of possible connections from among the multicores 140, 150, 160, and 170. The profiling unit 110 may set configuration bits in the manually set configuration information register 340. For example, the configuration bits may correspond to a configuration among the multicores 140, 150, 160, and 170 producing the optimum performance in the performance measurement.

The OS set configuration information register 350 stores configuration information set by the OS. The OS may operate on one of the multicores 140, 150, 160, and 170, for example, the core #0 140 (see FIG. 1). For example, the OS may dynamically set configuration information in the OS set configuration information register 350 by monitoring the operation state of the multicores 140, 150, 160, and 170, in real time, such that the performance of the multicore system 100 is optimized in real time. Alternatively, the OS may dynamically set configuration information in the OS set configuration information register 350 with the change of an application to be performed and/or the change of a thread for executing the application.

The configuration information select unit 360 may select one of the configuration information respectively input from the lookup table 330, the manually set configuration information register 340, and the OS set configuration information register 350, and may transfer the selected configuration information to the switching units 122, 123, 124, 125, and 126.

Figure 4:
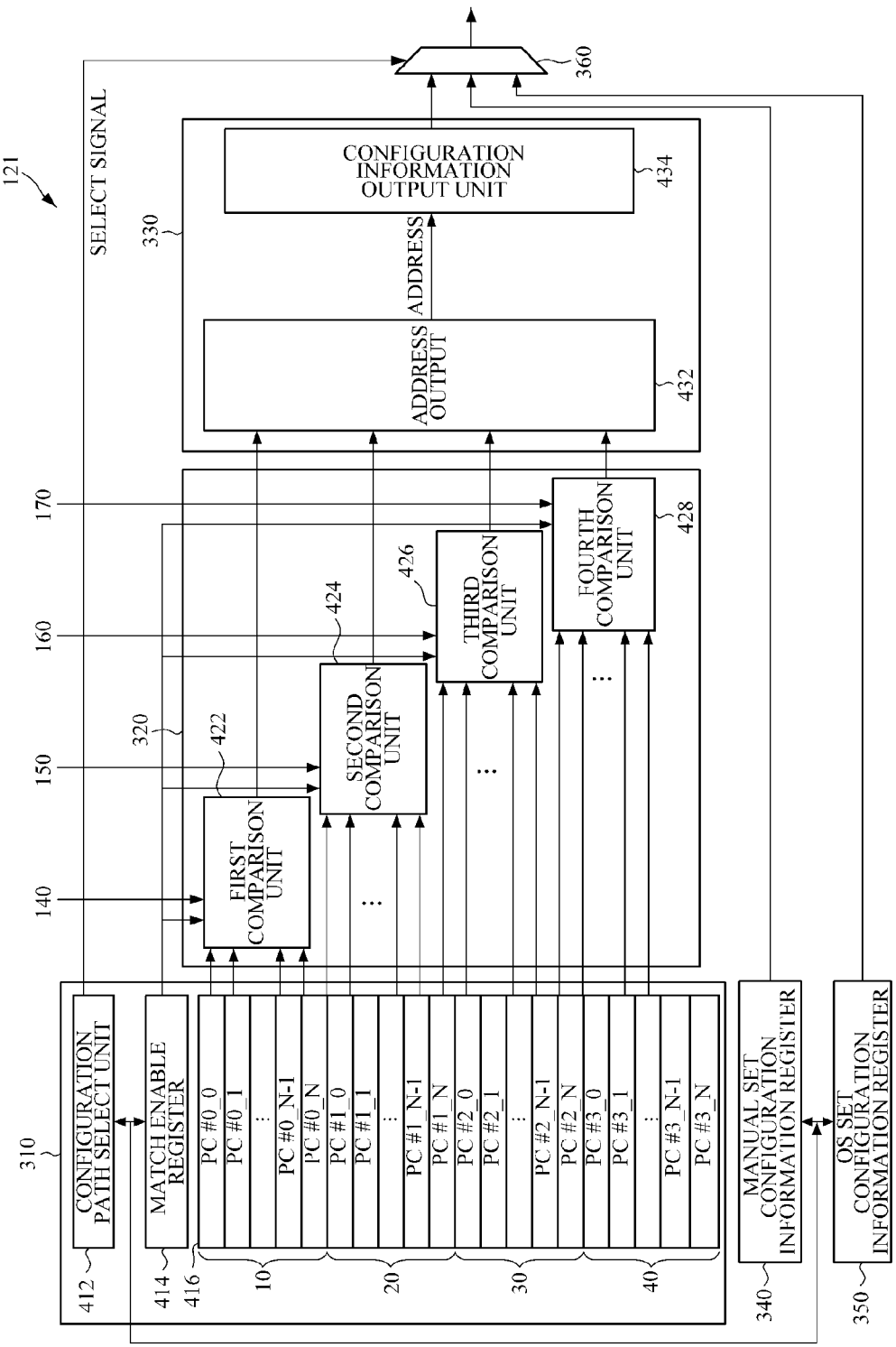
FIG. 4 is a block diagram illustrating an example of the configuration information generating unit shown in FIG. 3.

FIG. 4 illustrates an example of the configuration information generating unit shown in FIG. 3.

Referring to FIG. 4, control register 310 includes a configuration path select unit 412, a match enable register 414, and a program counter register (PC register) 416.

The configuration path select unit 412 may output a select signal for selecting configuration information output from the lookup table 330 through matching of the program counter. The configuration path select unit 412 may manually set configuration information output from the manually set configuration information register 340 and OS set configuration information output from the OS set configuration information register 350, by controlling the configuration information select unit 360. The configuration information select unit 360 may output configuration information that is selected according to the select signal of the configuration path select unit 412.

The match enable register 414 may enable an operation of the condition checking unit 320. For example, the match enable register 414 may enable an operation of the condition checking unit 320 if the configuration path select unit 412 chooses to output configuration information that is generated by use of the program counter received from the multicores 140, 150, 160, and 170.

The PC register 416 stores the program counter indicating the time point at which the connection on the multicores 140, 150, 160, and 170 needs to be changed. For example, the PC register 416 may include a PC register 10 for the core #0 140, a PC register 20 for the core #1 150, a PC register 30 for the core #2 160 and a PC register 40 for the core #3 170. For example, the PC register 10 for the core #0 may store program counters of PC#0_0 to PC#0_N.

The condition checking unit 320 may compare the program counter received from the multicores 140, 150, 160, and 170 with the program counter stored in the PC register 416 to determine the match. In this example, the condition checking unit 320 includes a first comparison unit 422, a second comparison unit 424, a third comparison unit 426, and a fourth comparison unit 428.

For example, the first comparison unit 422 may compare the program counter received from the core #0 140 with the program counter stored in the PC register 10 for the core #0 140. The second comparison unit 424 may compare the program counter received from the core #1 150 with the program counter stored in the PC register 20 for the core #1 150. The third comparison unit 426 may compare the program counter received from the core #2 160 with the program counter stored in the PC register 30 for the core #2 160. The fourth comparison unit 428 may compare the program counter received from the core #3 170 with the program counter stored in the PC register 40 for the core #3 170.

The lookup table 330 may include an address output unit 432 and a configuration information output unit 434. For example, the address output unit 432 may include address information corresponding to a matched program counter for each core. The address output unit 433 may output the address information for the matched program counter to the configuration information output unit 434.

The configuration information output unit 434 may store configuration information for each address information and may output configuration information corresponding to address information output from the address output unit 432 to the configuration information select unit 360.

Figure 5:
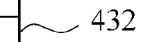
FIG. 5 is a diagram illustrating an example of an address output unit included in a lookup table shown in FIG. 4.

FIG. 5 illustrates an example of an address output unit included in the lookup table shown in FIG. 4.

As shown in FIGS. 4 and 5, the address output unit 432 may include program counters for the respective cores and address information. The program counter for each core may be mapped to the address information at a one to one correspondence and stored in the address output unit 432. For example, the PC#0_0 may be matched to the core #0 140, the PC#1_0 may be matched to the core #1 150, the PC#2_0 may be matched to the core #2 160, and the PC#3_0 may be matched to the core #3 170. The address output unit 432 may output address 0 to the configuration information output unit 434.

Figure 6:
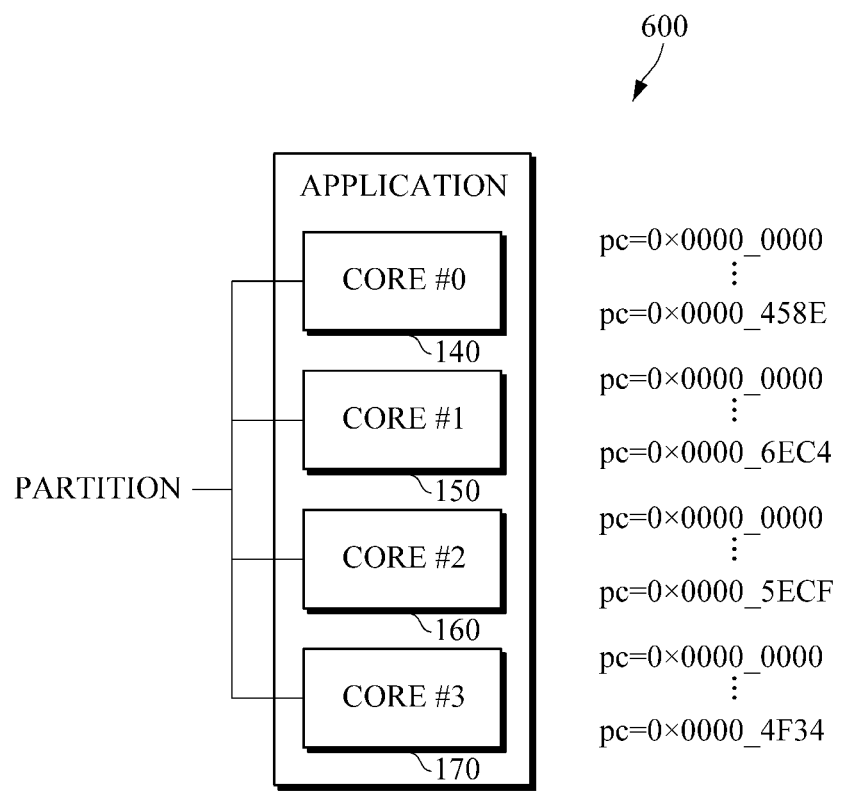
FIG. 6 is a diagram illustrating an example of an operation of partitioning an application by a profiling unit.

FIG. 6 illustrates an example of an operation of partitioning an application by a profiling unit.

For the multicores to perform distributed processing on an application to be executed, an application partition may be performed to partition the application for each multicore. For example, the profiling unit 110 may create a data flow graph and a control flow graph to measure the performance for each core and the overall application performance.

As shown in FIG. 6, the operation of the application may be distributed among a plurality of cores, for example, the core #0 140, the core #1 150, the core #2 160, and the core #3 170 so that program counters for each core may be generated. For example, if part of the application assigned to the core #0 140 is complied, program counters from 0x0000_0000 to 0x0000_485E may be generated for the core #0 140.

Figure 7:
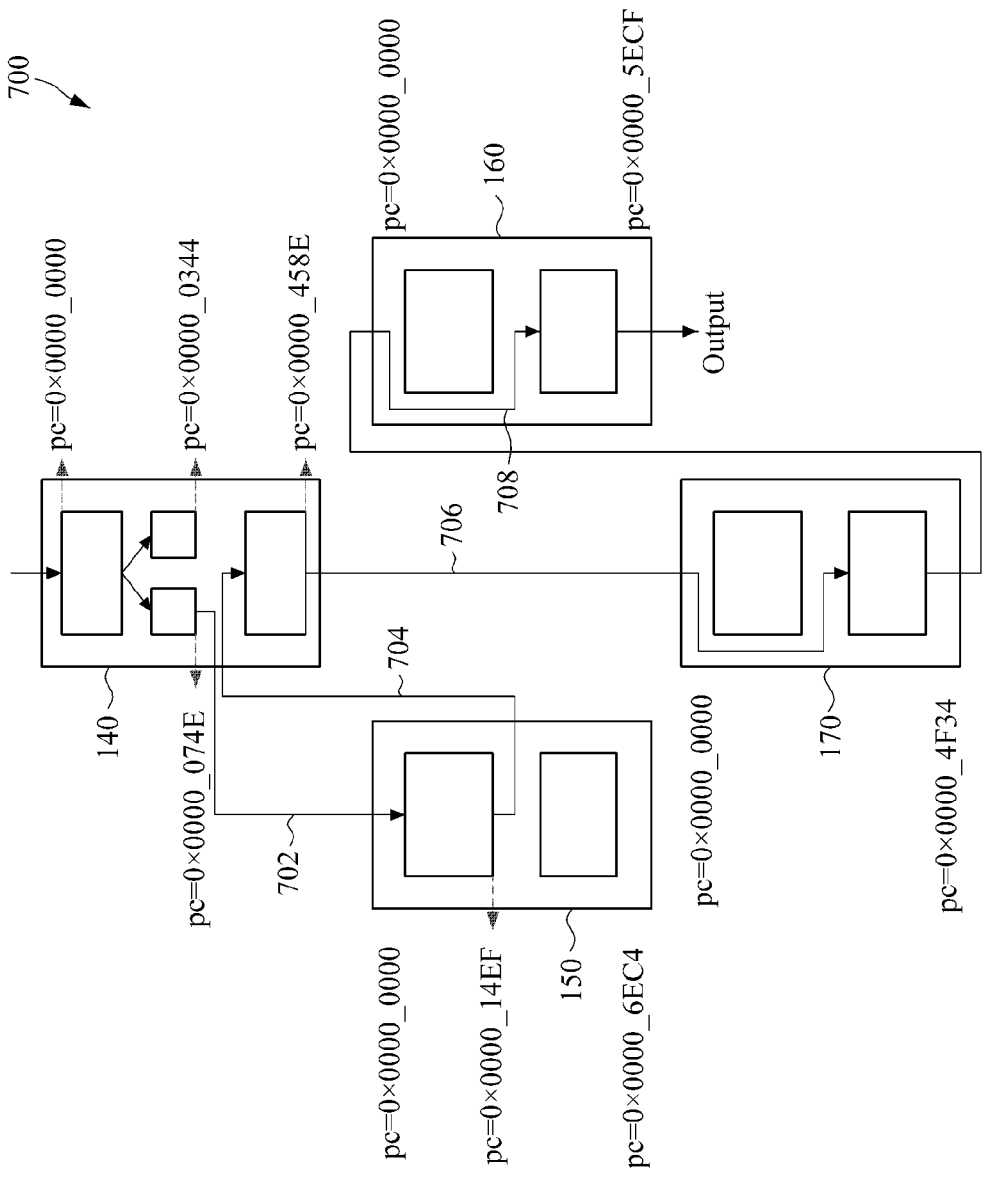
FIG. 7 is a diagram illustrating an example of a configuration among multicores according to a data transfer flow among the multicores.

FIG. 7 illustrates an example of a configuration of the multicores according to a data transfer flow among the multicores.

As the application partitioning and profiling are performed, it may be determined that data is transferred among the multicores 140, 150, 160, and 170 as shown in FIG. 7.

Referring to FIGS. 1 and 7, it may be determined that it is desired that the core #0 140 is connected to the core #1 150, the core #1 150 is connected to the core #0 140, the core #0 140 is also connected to the core #3 170, and the core #3 170 is connected to the core #2 160. For example, when a program counter value of the core #0 140 is 0x000_485E, this may indicate that the connection of the core #0 140 needs to changed from the core #1 150 to the core #3 170. Accordingly, the profiling unit 110 may set 0x000_485E as a program counter for the core #0 140 in the PC register 416 of the control register 310 shown in FIG. 3.

The profiling unit 110 may perform profiling to correspond to the number of cases is involving the application partitioning that is performed in the multicores 140, 150, 160, and 170, and may analyze the application performance for each case. Accordingly, the profiling unit 110 may set a program counter in the PC register wherein the program counter corresponds to a case in which the optimum performance is produced by the multiple cores.

Accordingly, as an example, when a program counter is received from the core #0 140, and if the received program counter is the same as the preset program counter 0x000_485E, the configuration information generating unit 121 may output configuration information corresponding to the same program counter 0x000_485E. For example, the output configuration information may be transferred to the first switching unit 122 and the first switching unit 122 may change a connection of the core #0 140 such that the core #0 140 is connected to the core #3 to achieve optimal processing performance.

Figure 8:
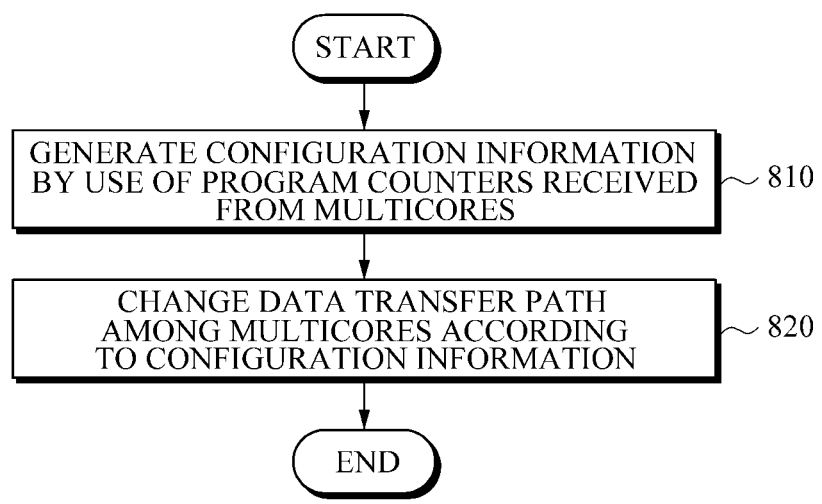
FIG. 8 is a flowchart illustrating an example of a method for routing data among multicores.

FIG. 8 illustrates an example of a method for routing data among multicores.

Referring to FIG. 8, the data routing apparatus 120 generates configuration information indicating a local network connection among multicores using program counters received from the multicores, in 810.

For example, the data routing apparatus 120 may receive the respective program counters from the multicores and may compare the received program counter with a pre-stored program counter for each multicore. For example, the pre-stored program counter for each core may indicate an instruction that is executed when a data transfer path is changed. The program counter for each multicore indicating an instruction that is executed when a data transfer path is changed, may be set based on a profiling result of an application to be executed in the multicores. For example, the data routing apparatus 120 may output configuration information for changing the data transfer path, if the received program counter is the same as the stored program counter.

The data routing apparatus 120 changes the data transfer path among the multicores according to the configuration information, in 820. As a result, the application is executed based on the changed configuration of multicores.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to route data among multicores, the apparatus comprising:
a configuration information generating unit configured to
receive a program counter from each of the multicores, the program counter for each multicore indicating an instruction to be executed when a data transfer path among the multicores is changed, and
generate configuration information indicating a local network connection among the multicores based on the program counter received from each of the multicores;
a switching unit configured to change the data transfer path among the multicores according to the configuration information; and
a lookup table configured to output the configuration information to the switching unit in response to a received program counter from one of the multicores being the same as a stored program counter for that multicore.

2. The apparatus of claim 1, wherein the configuration information generating unit comprises:
a control register configured to store program counters for the respective multicores; and
a condition checking unit configured to receive each respective program counter from the multicores and compare each received program counter with the stored program counters for that respective multicore.

3. The apparatus of claim 2, wherein the lookup table comprises:
an address output unit configured to output address information for the same program counter, and
a configuration information output unit configured to output configuration information for the address information.

4. The apparatus of claim 2, further comprising a profiling unit configured to perform profiling on an application to be executed in the multicores and to set the stored program counters for the respective multicores in the control register, wherein the stored program counters for the respective multicore indicate instructions which are to be executed when the data transfer path is changed.

5. The apparatus of claim 4, wherein the profiling unit creates a data flow graph and a control flow graph to measure a performance for each multicore and overall application performance.

6. The apparatus of claim 1, wherein operating system (OS) set configuration information is set in the configuration information generating unit, and the OS set configuration information is configured to change the data transfer path according to a real time request by an OS.

7. The apparatus of claim 6, wherein manually set configuration information is set in the configuration information generating unit.

8. The apparatus of claim 7, wherein the configuration information generating unit selects one of the configuration information generated by the program counter, the OS set configuration information, and the manually set configuration information, and transfers the selected configuration information to the switching unit.

9. The apparatus of claim 1, wherein the lookup table generates the configuration information based on a comparison between the received program counter and stored program counters.

10. A method of routing data among multicores, the method comprising:
receiving a program counter from each of the multicores, the program counter for each multicore indicating an instruction to be executed when a data transfer path among the multicores is changed;
generating configuration information indicating a local network connection among the multicores based on the program counter received from each of the multicores;
outputting the configuration information to a switching unit in response to the received program counter being the same as a stored program counter; and
changing the data transfer path among the multicores according to the configuration information.

11. The method of claim 10, wherein, the generating of the configuration information comprises:
receiving the program counters from the multicores; and
comparing a stored program counter for each multicore with the received program counter for each multicore, in which the stored program counter for each multicore indicates an instruction which is to be executed when the data transfer path is changed.

12. The method of claim 11, wherein the outputting of the configuration information comprises:
generating address information for the same program counter; and
outputting configuration information for the generated address information.

13. The method of claim 10, wherein the generating of the configuration information comprises:
selecting one of configuration information generated based on the program counter, operating system set configuration information used to change the data transfer path upon a real time request by an operating system, and manually set configuration information and transferring the selected configuration information.

14. The method of claim 10, further comprising
performing profiling on an application to be executed in the multicores; and
setting the program counters for the respective multicores, the program counter for each of the multicores indicating an instruction which is to be executed when the data transfer path is changed.

15. A data routing apparatus, comprising:
a configuration information generating unit configured to
receive a program counter from among multiple cores, the program counter indicating an instruction to be executed when a data transfer path among the multiple cores is changed, and
generate configuration information that indicates a local network connection among the multiple cores based on the received program counter;
a switching unit configured to change the data transfer path between the multiple cores to an optimal processing path based on the configuration information; and
a lookup table configured to output the configuration information to the switching unit in response to the received program coulter being the same as a stored program counter.

16. The data routing apparatus of claim 15, wherein the switching unit is a multiplexer.

17. The data routing apparatus of claim 15, further comprising a profiling unit configured to measure the performance of each core of the multiple cores and to set a program counter for each respective core based on an optimal processing performance of the multiple cores.

* * * * *